United States Patent [19]

Gallant et al.

[11] Patent Number: 5,761,500
[45] Date of Patent: Jun. 2, 1998

[54] MULTI-SITE DATA COMMUNICATIONS NETWORK DATABASE PARTITIONED BY NETWORK ELEMENTS

[75] Inventors: John K. Gallant; Steven R. Donovan, both of Plano, Tex.

[73] Assignee: MCI Communications Corp., Washington, D.C.

[21] Appl. No.: 634,330

[22] Filed: Apr. 18, 1996

[51] Int. Cl.[6] .................................................. G06F 17/30
[52] U.S. Cl. .......................... 395/610; 395/615; 395/678; 395/619
[58] Field of Search ........................... 395/60 H, 61 H, 395/62 H

[56] References Cited

U.S. PATENT DOCUMENTS

| | | | |
|---|---|---|---|
| 4,710,870 | 12/1987 | Blackwell et al. | 364/200 |
| 4,714,995 | 12/1987 | Materna et al. | 395/617 |
| 4,788,643 | 11/1988 | Trippe et al. | 395/206 |
| 4,853,843 | 8/1989 | Ecklund | 395/619 |
| 5,140,689 | 8/1992 | Kobayashi | 395/575 |
| 5,146,561 | 9/1992 | CArey et al. | 395/200.3 |
| 5,212,788 | 5/1993 | Lomet et al. | 395/600 |
| 5,271,013 | 12/1993 | Gleeson | 371/9.1 |
| 5,274,802 | 12/1993 | Altine | 395/600 |
| 5,291,594 | 3/1994 | Sekiguchi et al. | 395/600 |
| 5,317,731 | 5/1994 | Dias et al. | 395/608 |
| 5,423,037 | 6/1995 | Hvasshovd | 395/618 |
| 5,434,994 | 7/1995 | Shaheen et al. | 395/617 |
| 5,555,404 | 9/1996 | Torbjornsen et al. | 395/618 |
| 5,586,310 | 12/1996 | Sharman | 395/610 |
| 5,594,942 | 1/1997 | Antic et al. | 395/615 |
| 5,625,815 | 4/1997 | Maier et al. | 395/608 |
| 5,625,818 | 4/1997 | Zarmer et al. | 395/615 |
| 5,671,436 | 9/1997 | Morris et al. | 395/610 |

OTHER PUBLICATIONS

D. M. Balston, "Pan-European cellular radio: or 1991 and all that", *Electronics & Communication Engineering Journal*, Jan./Feb. 1989, pp. 7-13.

D. J. Goodman, "Second Generation Wireless Information Networks", *IEEE Transactions on Vehicular Technology*, vol. 40, No. 2, May 1991, pp. 366-374.

M. B. Pautet and M. Mouly, "GSM Protocol Architecture: Radio Sub-System Signalling", *IEEE Vehicular Technology Conference*, May 1991, pp. 326-332.

*Primary Examiner*—Wayne Amsbury

[57] ABSTRACT

A system and method for improving database system reliability and availability and ensuring database consistency in multiple network database system sites, for example, home location register (HLR) sites of a wireless telecommunications network. There are a plurality of database system sites, each of which contains at least one complete copy of the entire database. The database is partitioned into multiple partitions, with each partition serviced by multiple database system sites with differing priority. The highest priority database system site which is available for each partition provides access and update service to the partition. In addition, the serving database system site sends update messages to the other database system sites, so that all copies of the partition are consistent. Update messages are sent on a deferred basis, so as to even out message traffic on the network.

34 Claims, 12 Drawing Sheets

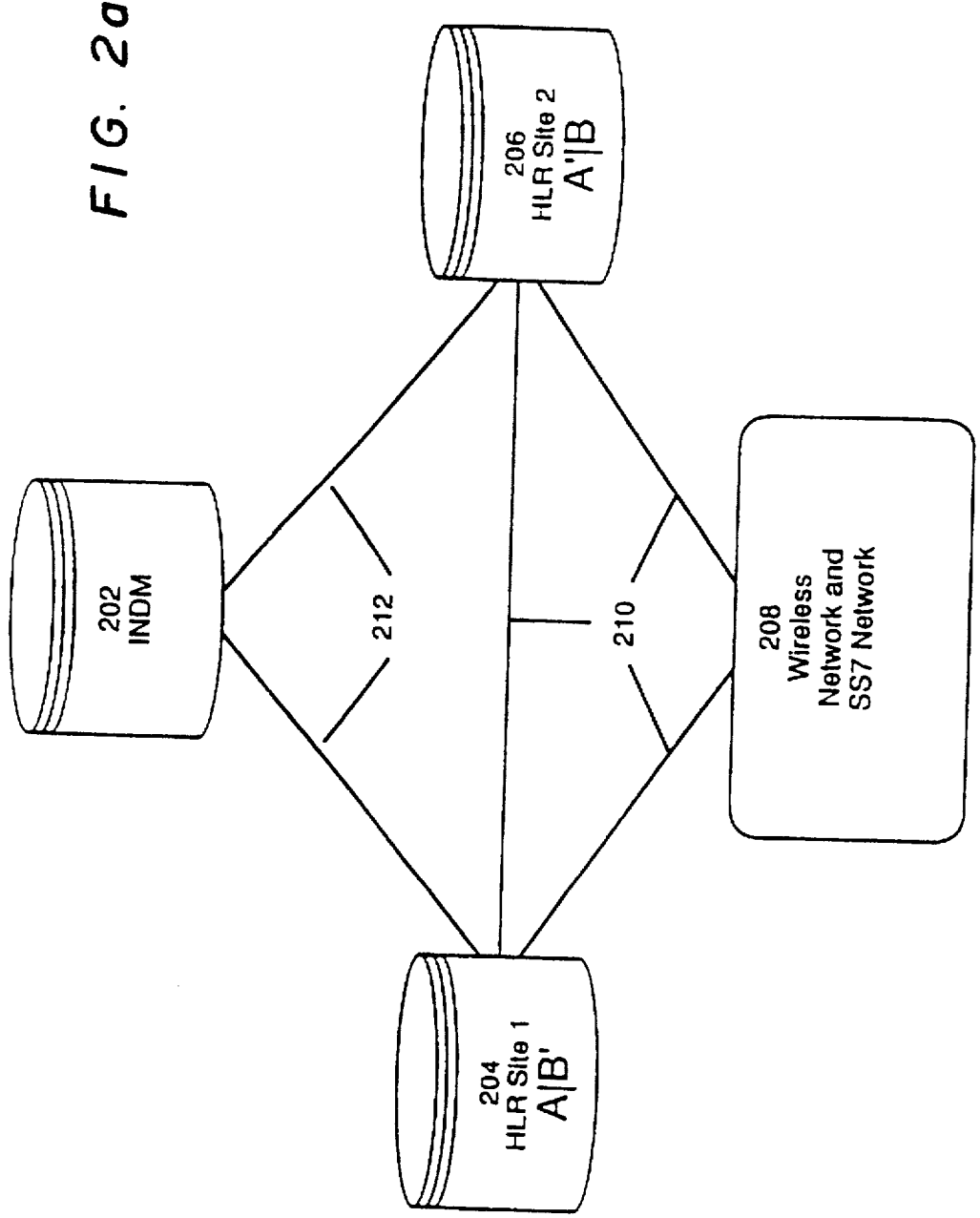

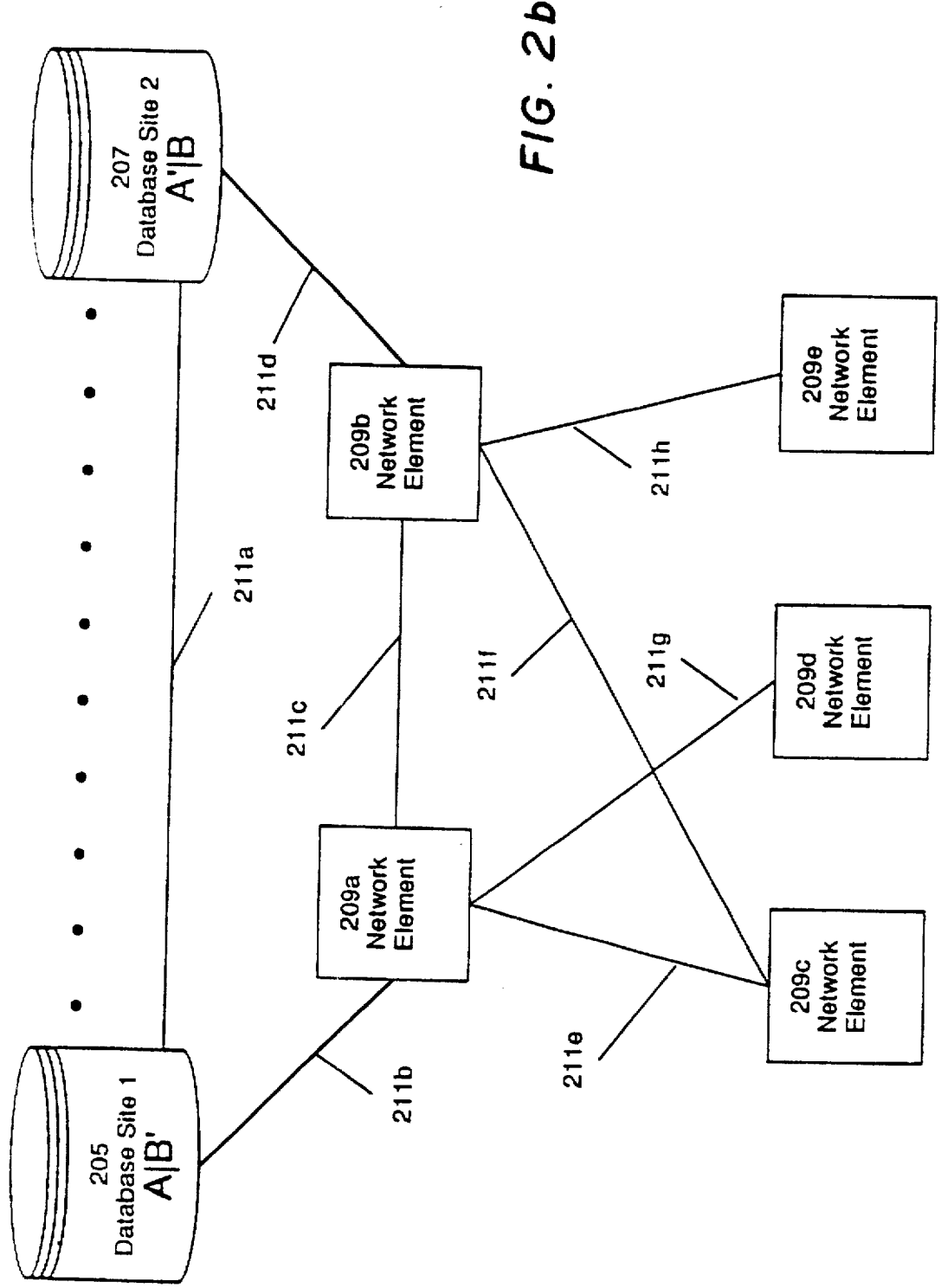

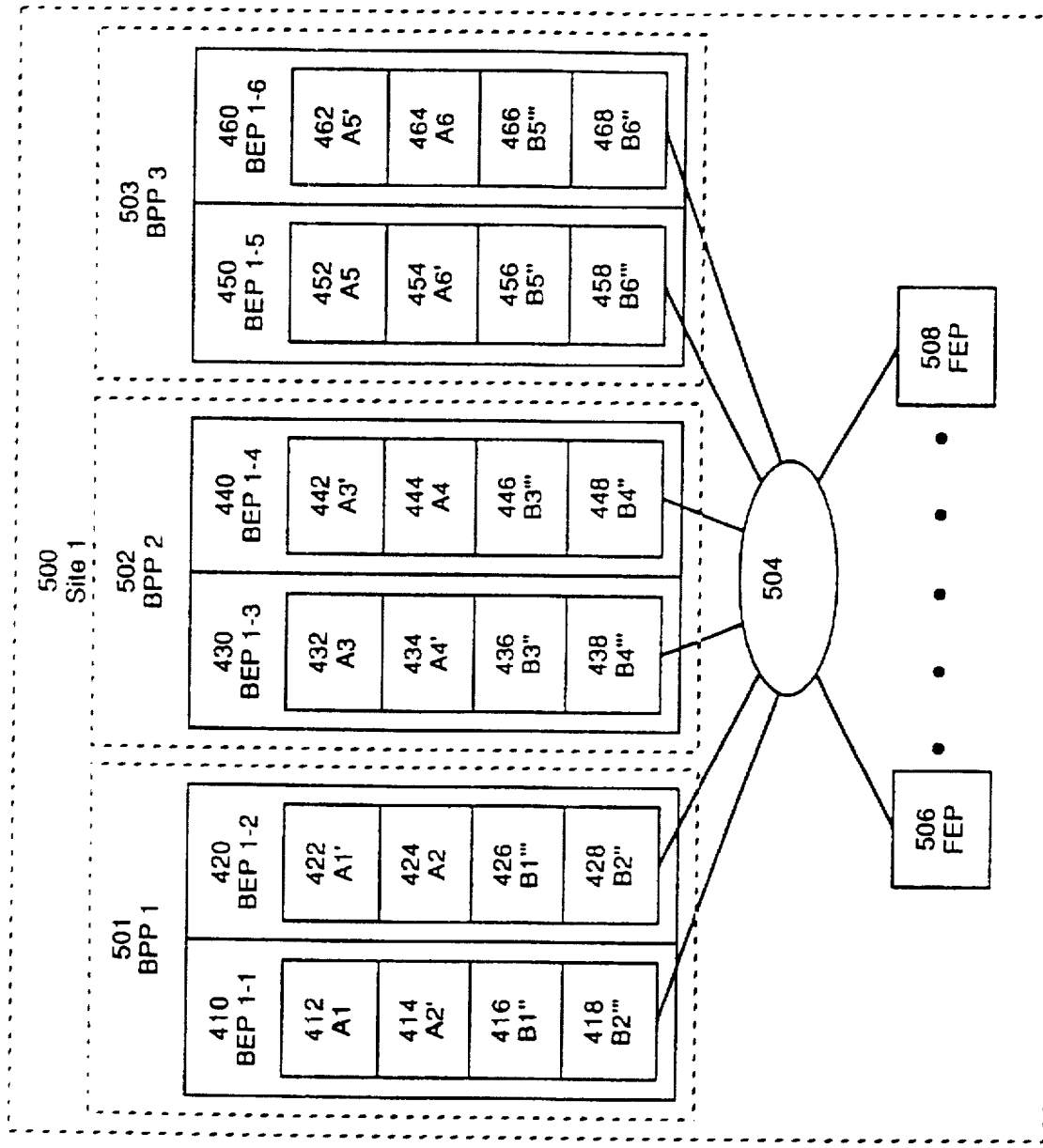

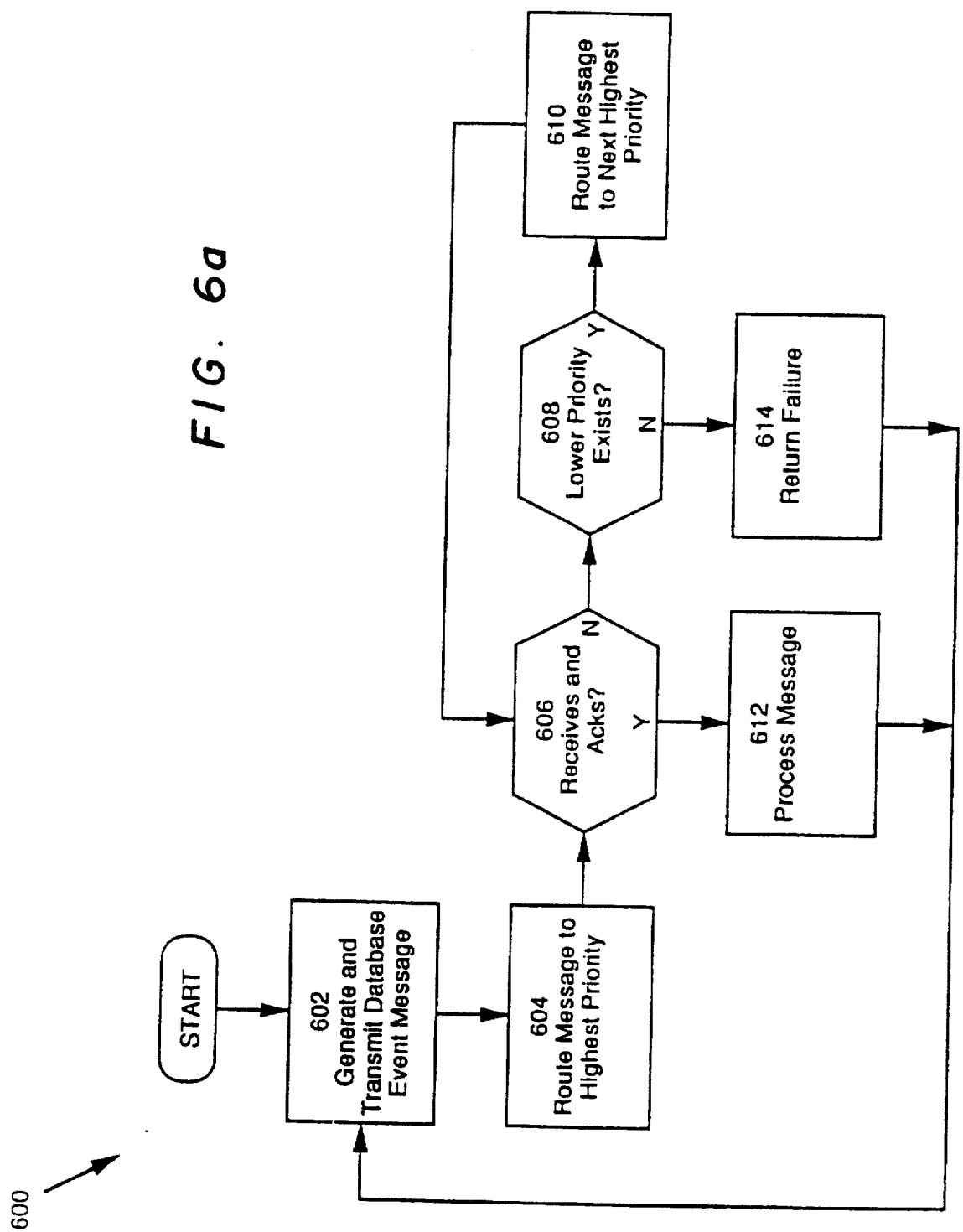

5,761,500

MULTI-SITE DATA COMMUNICATIONS NETWORK DATABASE PARTITIONED BY NETWORK ELEMENTS

BACKGROUND OF THE INVENTION

1. Field of the Invention

The present invention relates to network database systems and in particular to reliability and updating of multiple network database systems, especially database systems used in wireless telecommunications networks.

2. Background Information

The present invention is applicable to any network database system. However, a wireless telecommunication network containing database systems known as home location registers (HLRs) is used as an example to describe the invention. Any differences between the wireless network database systems and general purpose network database systems are well known to those of skill in the art.

The particular wireless system used as an example here is the Global System for Mobile Communications (GSM). In 1982, GSM was established in Europe, to provide a cellular mobile radio system. The primary function of the GSM is to provide a full roaming mobile telephone service. The GSM protocol has been selected for use around the world for digital cellular telephone service. The principals of operation of the existing GSM digital cellular telephone system is described in the following references:

Balston, D. M., "Pan-European Cellular Radio", IEEE Electrical and Communications Journal, No. 1, pp. 7–13, 1989.

Goodman, D. J., "Second Generation Wireless Information Networks", IEEE Transactions on Vehicular Technology, VT-40, May 1991, pp. 366–374.

Pautet, M. B., and Mouly, M., "GSM Protocol Architecture: Radio Subsystem Signaling", IEEE Vehicular Technology Conference, May 1991, pp. 326–332.

A cellular mobile radio system includes a variety of elements, as shown in FIG. 1. In FIG. 1, many of the elements shown represents a plurality of similar elements, although only a limited number are shown and described. The system includes subscriber terminal 120 which represents a plurality of subscriber terminals present in the network. A subscriber terminal may be any terminal that would be connected in a wireless fashion, for example, a handset, a fixed wireless terminal, a PDA (Personal Digital Assistant), a computer or a laptop with wireless modem, etc. Subscriber terminal 120 includes the subscriber terminal component 122 and its antenna 124, which receives and transmits radio signals with the antenna 114 of the base station 103. Subscriber terminal 120 also includes the subscriber identity module (SIM) 126, or its equivalent, which personalizes a subscriber terminal 120.

Base station 103 includes a base controller station (BSC) 106 and one or more base transceiver stations (BTS) 108. Each BTS 108 depicted in FIG. 1 represents a plurality of BTSs 108 which are part of a base station cluster controlled by the BSC 106. The BTS 108 transmits and receives radio signals on the antenna 114. For much of the network, BTSs are organized in a seven cell or twelve cell repeat pattern with omni-directional coverage for each. Thus, seven or twelve BTSs are connected to each BSC 106. Most BTSs have between 20 and 30 voice channels with one signaling channel carrying all of the paging and access functions per cell. Each BSC 106 represents a plurality of BSCs connected to MSC 104. BSC 106 controls the operation of each connected BSC 108.

Each mobile service center (MSC) 104 represents a plurality of MSCs. MSC 104 is a digital exchange with a distributed control architecture especially adapted for operation in the cellular environment. The base transceiver stations 108 and base station controllers 106 are connected to the MSCs 104 over digital lines. MSCs in a local area are connected to form a local network 100. Each local network 100 has a gateway MSC 105 which provides communication with other local networks 100' over communication line 109 and with the home location register (HLR) 110, over communication line 111. In addition, the public switched telephone network 102 is connected to the mobile services switching center (MSC) 104.

Associated with each MSC 104 is a visitor location register (VLR) 112. Each MSC 104 typically has its own VLR 112, but this is not required. Gateway MSC 105 provides gateway services between a VLR 112 and MSC 104, when VLR 112 is located separately from MSC 104, as shown in FIG. 1. VLR 112 stores selected data relating to subscriber terminals 120 that are visiting within the home network 100 associated with VLR 112 and its MSC 104. The data stored in VLR 112 is transferred from HLR 110 to VLR 112 for each subscriber terminal 120 within the home network 100 of the VLR 112. This data can include the international mobile station identity (IMSI), the mobile station international ISDN number, and other information, including the current geographic location of the subscriber terminal 120, and the services available to the subscriber terminal 120, for example supplementary voice services or data services.

Each MSC 104 is associated with a home location register (HLR) 110 in the network. The home location register (HLR) 110 stores all management data relating to all of the subscriber terminals 120 in the network. This data includes the international mobile station identity (IMSI), the subscriber terminal profile of capacities and services unique to the subscriber terminal 120, and the location of the subscriber terminal 120 within the overall GSM network. HLR 110 is connected over signaling network 113 to the MSCs 104 of all networks 100 in the system. HLR 110 is connected to the MSCs 104 within each network 100 by way of gateway MSC 105. Control messages are exchanged between the MSC 104, VLR 112 and HLR 110, using the mobile application part (MAP) communication protocol.

Every subscriber terminal 120 is allocated to a specific HLR 110 and the code which forms a part of the international mobile station identity (IMSI) for a particular subscriber terminal 120, will include the information identifying the specific HLR 110. This information is used to enable calls to be made when, for example, a subscriber terminal 120 visits a network other than its home network. The subscriber terminal 120 is requested to pass the IMSI on the uplink to the nearest base station 100 and this value is forwarded via the MSC 104 to the VLR 112 connected to the MSC 104. In the prior art GSM systems, the VLR 112 then accesses the HLR 110 via fixed network links, in order to obtain the selected information needed for registration of the subscriber terminal 120.

A problem arises in the wireless network of FIG. 1. If the HLR becomes unavailable, either due to failure of the HLR itself or due to failure of communications with the HLR, the entire wireless network will be unable to operate. Clearly, multiple HLRs are needed in order to provide sufficient network reliability. In addition, it will be seen that the HLR must process a very large quantity of message traffic. For example, a registration message is sent to the HLR every time a subscriber terminal is activated. In a nationwide wireless network, the message traffic greatly exceeds the processing capacity of a single HLR. Thus, it is necessary to use multiple HLRs in a typical wireless network, so as to accommodate the large quantities of data and message traffic.

However, problems arise when multiple HLRs are used. If each HLR contains only a portion of the data for the entire network and an HLR fails, those subscribers whose subscriber terminals are allocated to that HLR will be without service until the HLR is restored. One way around this is to store all the data for the entire network on each HLR. A problem arises with this arrangement in that the data in all HLRs must be kept consistent. This requires continuous updating of all HLR databases. A wireless network generates an enormous quantity of update information. In order to keep all database copies consistent, update information must be sent to every HLR database in the network. This further increases the quantity of information and the message traffic which must be handled. A problem arises in that this quantity of information and message traffic can easily exceed the system capacity. In this case, large-scale disruption of wireless service is likely.

SUMMARY OF THE INVENTION

The present invention is a system and method for improving database reliability and availability and ensuring database consistency in multiple HLR sites of a wireless telecommunications network. The present invention comprises a plurality of HLR sites, each of which contains at least one complete copy of the entire wireless database. The database is partitioned into multiple partitions, with each partition serviced by multiple HLR sites of differing priority. For each partition, one HLR site is primary, one is secondary, one is tertiary, and so on. Likewise, each HLR site is primary for one partition, secondary for another partition, tertiary for another partition, and so on. The primary HLR site of a partition provides service to the wireless network for that partition. Should the primary HLR site for a partition fail, the HLR site which has been assigned as secondary for that partition provides service for that partition, as well as primary service for its own primary partition, until the failed HLR site is restored. Should both the primary and secondary HLR sites for a partition fail, the tertiary site will provide service until either the primary or secondary site is restored. The architecture allows this redundancy to be extended to as many levels as desired. Thus, the present invention provides multiple levels of redundancy to ensure availability of the entire database.

The present invention further provides improved database consistency without excessive overhead. The primary HLR site for a partition is responsible for updating the data in that primary partition. Updates are routed to the primary HLR site, which updates its database, then schedules update messages to be sent to all other HLR sites, in order of priority of assignment. In order to reduce processing overhead, update messages for other HLR sites are typically not sent individually, but rather are collected and sent as a group of updates in one message. In addition, transmission of the message is deferred so as to spread out the message traffic over a longer period of time. This prevents the peak message traffic from exceeding the system capacity. The maximum message size and the maximum transmission delay may be set so as to optimize system performance.

BRIEF DESCRIPTION OF THE DRAWINGS

FIG. 2a is a block diagram of a wireless telecommunications network, in accordance with one embodiment of the present invention.

FIG. 2b is a block diagram of a data communications network in accordance with another embodiment of the present invention.

FIG. 2c is a block diagram of a home location register site, in accordance with the embodiment of the present invention shown in FIG. 2a.

FIG. 5 is a block diagram of an embodiment of one HLR site of the present invention having six BEPs.

FIG. 6a is a flow diagram of a process 600, in accordance with the present invention.

FIG. 6b is a flow diagram of a subprocess of step 612 of FIG. 6a.

DETAILED DESCRIPTION OF THE INVENTION

Figure 1:
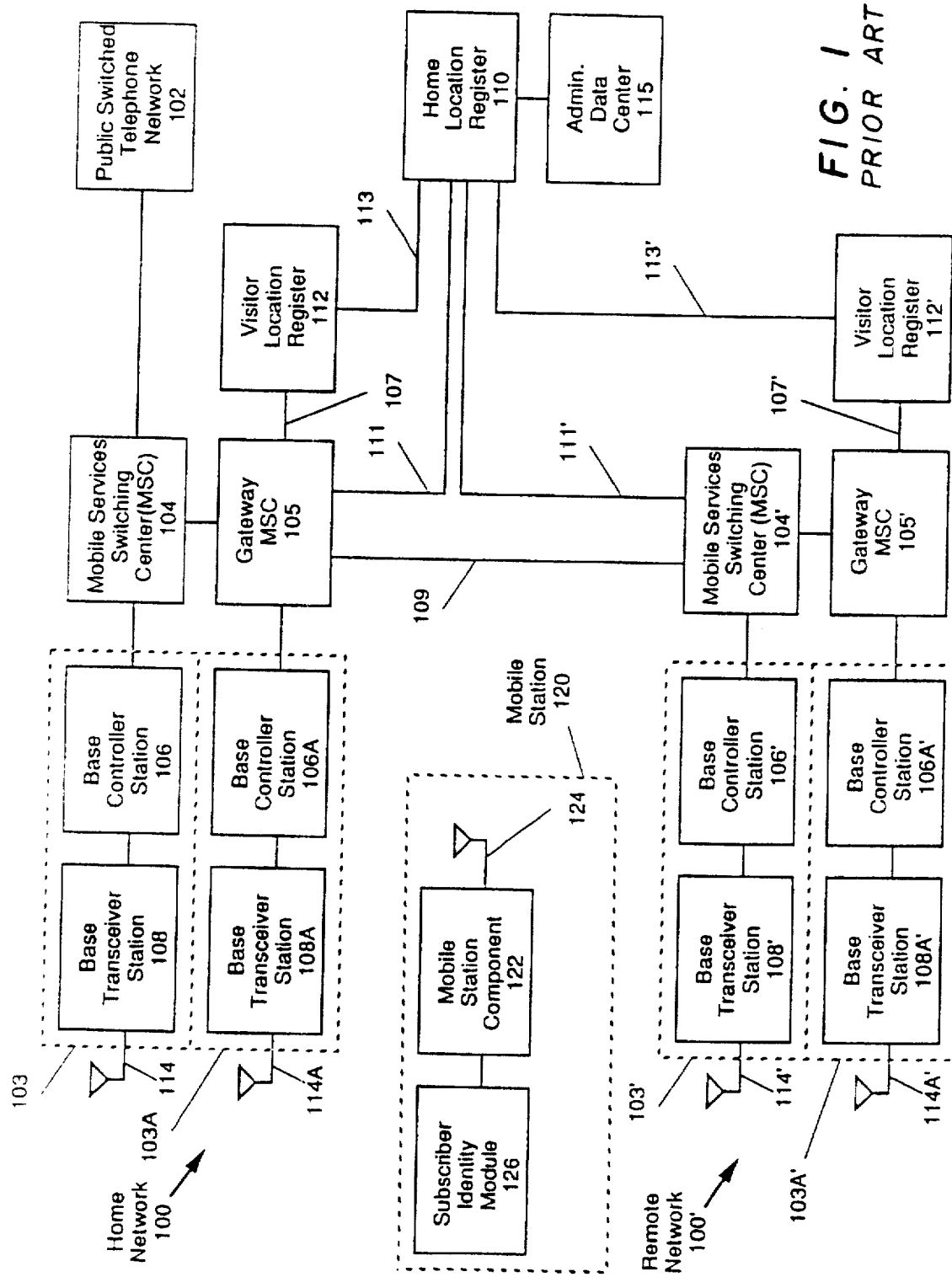
FIG. 1 is a block diagram of a conventional wireless telecommunications network.

FIG. 2a is a block diagram of a two site embodiment of an HLR. The entire conventional wireless and SS7 telecommunications network is represented by block 208. There are two HLR sites shown, HLR Site 1 204 and HLR Site 2 206. The two HLR sites 204 and 206 are communicatively coupled by communications links 210, which are typically high-speed T3-bridged Fiber Distributed Data Interface connections. The two HLR sites 204 and 206 are also communicatively coupled to Intelligent Network Data Manager (INDM) 202 by communications links 212, which are typically TCP/IP or other standard protocol based links. Each HLR site contains at least one complete copy of the network database. Each copy is divided into two major partitions: A and B. HLR Site 1 204 is the primary site for partition A and the secondary site for partition B. Thus, HLR site 204's copy of partition B is designated B', to indicate that it is a secondary copy. HLR Site 2 206 is the primary site for partition B and the secondary site for partition A, as indicated by designating HLR site 206's copy of partition A as A'. Intelligent Network Data Manager (INDM) 202 is responsible for maintaining database consistency for permanent data. This is not pertinent to the present invention, which is concerned only with handling of the transient data, but is shown for completeness.

The present invention is not limited to wireless telecommunication networks. It is equally applicable to any data communications network utilizing a real-time, high-speed database having a very high transaction rate of database writes. For example, the embodiment shown in FIG. 2b relates to a general-purpose data communication network, such as, for example, ethernet, token ring or any TCP/IP based protocol. Network elements 209a–e may be any well-known devices capable of communicating over a data communication network, such as, for example, personal computer systems, workstations, mini-computers, mainframe computers, file servers, packet switches, network bridges, network routers, etc. Network links 211a–h provide communications among network elements 209a–e. Network links 211a–h may be any well-known type of network, and need not all be the same type of network, since network elements such as network bridges provide the capability to communicate across different types of networks, as is also well-known. The only requirement is that each network element be linked by at least one path to each database site. Database Sites 205 and 207 are well-known network database systems which store data received from network elements 209a–e and supply data in response to requests from network elements 209a–e. Each database site contains at least one complete copy of the network database. Each copy is divided into two major partitions: A and B. Database Site 1 205 is the primary site for partition A and the secondary site for partition B. Thus, Database Site 205's copy of partition B is designated B', to indicate that it is a secondary copy. Database Site 2 207 is the primary site for partition B and the secondary site for partition A, as indicated by designating Database site 207's copy of partition A as A'.

In the following detailed description, a wireless telecommunication network containing HLR sites is used as an example. However, the description is equally applicable to a more general purpose data communication network containing database systems. The differences between the wireless network and the general purpose network are well known to those of skill in the art.

Figure 2C:
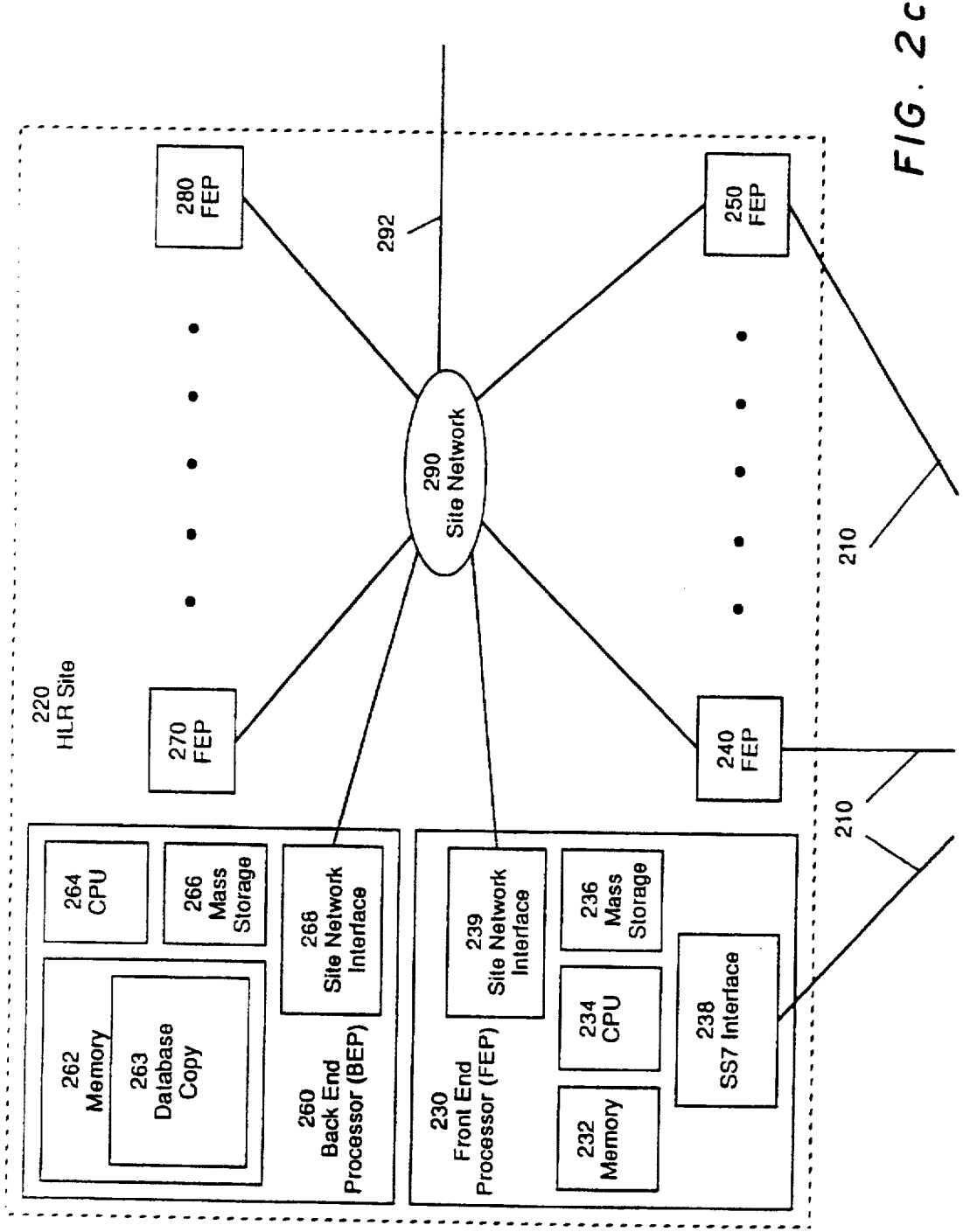

FIG. 2c is a block diagram of the internal structure of an individual HLR site 220. An HLR site contains three types of main elements: front end processors (FEP), such as FEPs 230 and 240–250, back end processors (BEP), such as BEPs 260 and 270–280, and a high-speed site data network 290. The FEP is used for communications with the telephony SS7 network. All network based queries to the HLR site come through the FEPs. FEPs, such as, for example, FEP 230 include a CPU 234 for executing program instructions and processing data, memory 232, for storing program instructions executed by and data processed by CPU 234, mass storage 236, for storing data to be transferred to and from memory, at least one SS7 network interface 238 for communicating with other devices on the SS7 network over communications links 210 and at least one site network interface 239 for communicating with other devices at the same HLR site over high-speed data network 290. All these elements are interconnected by a bus (not shown), which allows data to be intercommunicated between the elements, as is well known in the art.

The BEPs perform the database functions of the HLR site, such as, for example, data request access, data updating and data storage. BEPs, such as, for example, BEP 260 include a CPU 264 for executing program instructions and processing data, memory 262, for storing program instructions executed by and data processed by CPU 264, mass storage 266, for storing data to be transferred to and from memory, and at least one site network interface 268 for communicating with other devices at the same HLR site over high-speed data network 290. All these elements are interconnected by a bus (not shown), as is well known in the art. Memory 262 contains the working copy of the database. The database is backed up in mass storage 266. The entire database is stored in memory 262 and all accesses and updates to the database occur in memory. This is done because current mass storage devices do not have sufficient performance to meet access time requirements. It will be seen by those of skill in the art that in applications with less stringent performance requirements, it is entirely equivalent to access the database directly in mass storage. As mass storage devices improve in performance, it may become feasible to meet access time requirements with mass storage devices.

Site network 290 is a high speed, high performance data network, such as for example, the Fiber Distributed Data Interface (FDDI). This is a 100 megabit per second local connection. There are at least two separate FDDI connections to each machine, to provide for continued availability in the event of an individual FDDI connection failure. Although a high-speed network was selected for performance reasons, in applications with less stringent performance requirements, it is entirely equivalent to use other conventional networks, such as ethernet or token-ring. Connection 292 is a connection to other HLR sites. This is typically a high-speed T3-bridged Fiber Distributed Data Interface connection.

Figure 3:
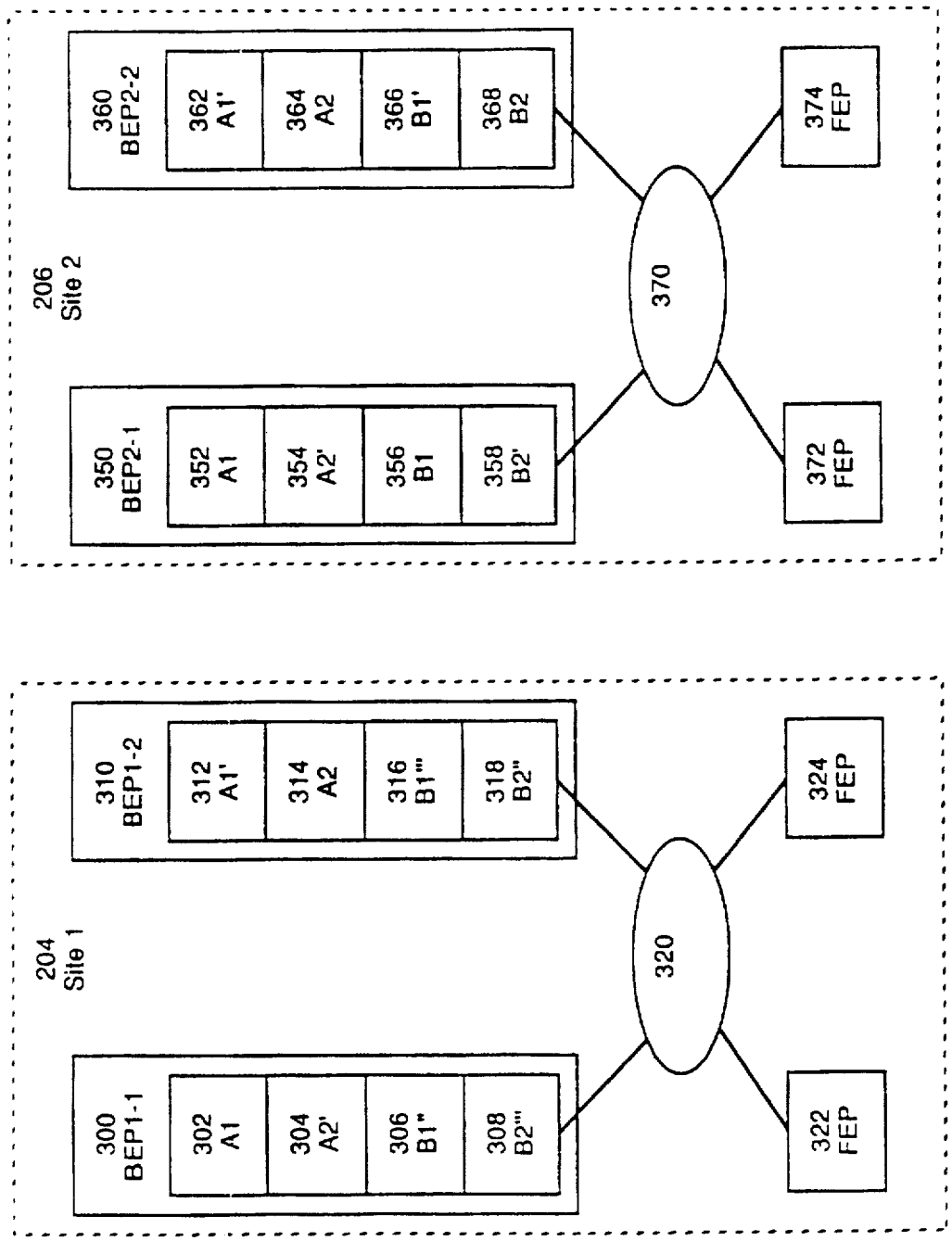
FIG. 3 is a block diagram of an embodiment of the present invention having two HLR sites, each site having two BEPs.

Each major partition is further divided into sub-partitions, as is seen in FIG. 3, which shows the internal structure of the two HLR sites 204 and 206 of FIG. 1. In this embodiment, each HLR site includes two BE processors, which are linked as BEP pairs (BPP). For example, HLR site 204 includes BEPs 300 and 310 which are linked by data network 320 to form a BPP. Also connected to data network 320 are front-end processors (FEP) 322 and 324, which interface the HLR site with the wireless and SS7 network. Each BEP contains a complete copy of the network database, divided into major partitions A and B. Each major partition is further divided into sub-partitions 1 and 2. For example, BEP 300 contains the four sub-partitions A1 302, A2 304, B1 306 and B2 308. Each BEP is the primary processor for at least one sub-partition. For example, BEP 300 is primary for sub-partition A1 302, secondary for sub-partition A2 (A2') 304, tertiary for sub-partition B1 (B1") 306 and quaternary for sub-partition B2 (B2'") 308.

Figure 4A:
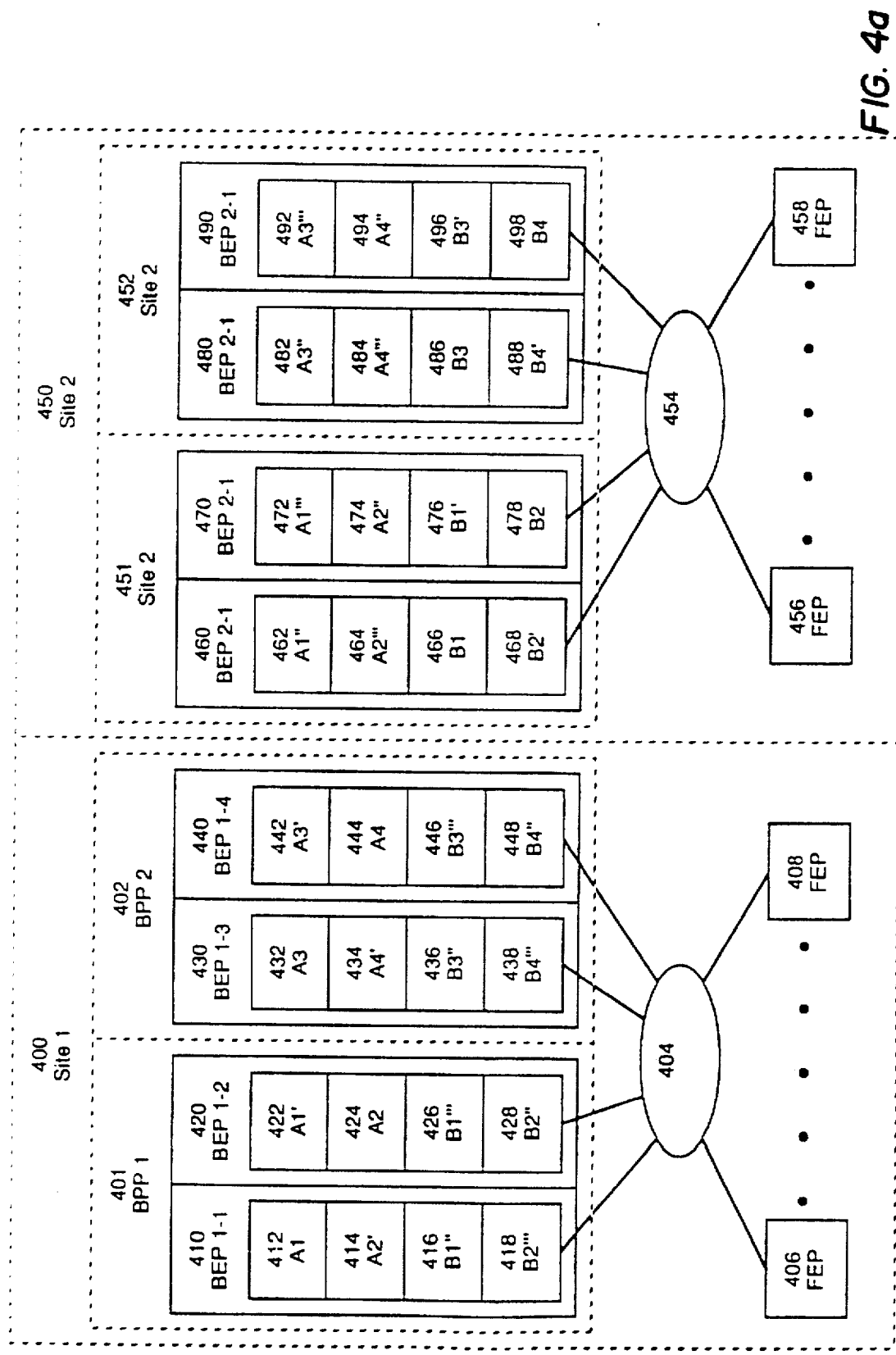
FIG. 4a is a block diagram of an embodiment of the present invention having two HLR sites, each site having four BEPs.

In FIG. 4a, there are two HLR sites 400 and 450, each of which has four BEPs grouped in BEP pairs 410, 402, 451 and 452. Since there are eight BEPs 410, 420, 430, 440, 460, 470, 480 and 490, the database is divided into eight partitions A1-4 and B1-4. In this embodiment, each BEP contains only four of the eight partitions of the database, but each HLR site contains two complete copies of the database. Each BEP is primary for one sub-partition and is secondary for the sub-partition for which its paired BEP is primary. For example, BEP 430 is primary for sub-partition A3 432 and secondary for sub-partition A4 434 while its paired BEP 440 is secondary for sub-partition A3 442 and primary for sub-partition A4 444.

Figure 4B:
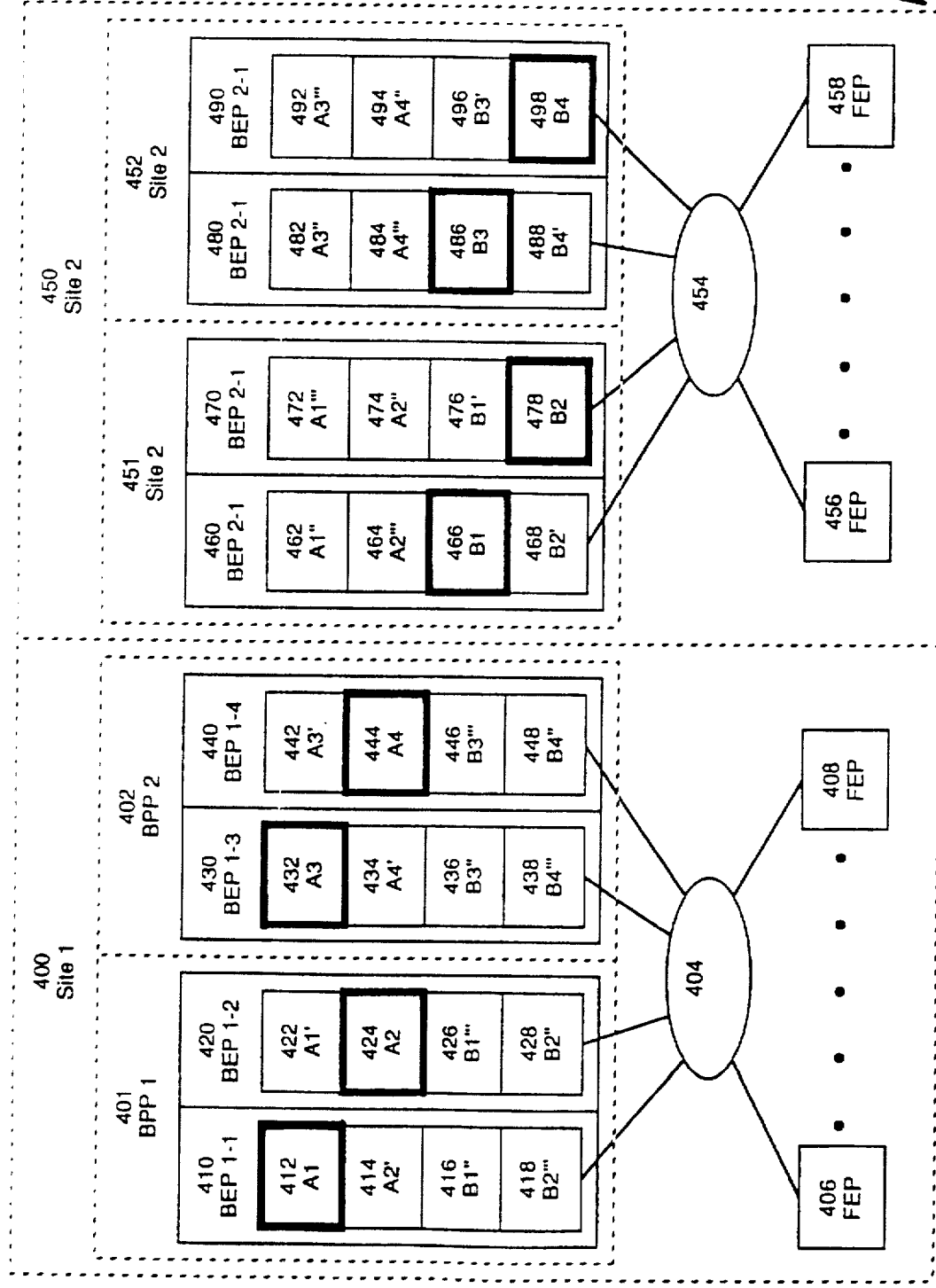
FIG. 4b is a block diagram of the embodiment of FIG. 4a, showing operation of the present invention during normal conditions.

FIG. 4b shows the normal operation of the embodiment of FIG. 4a. Each BEP is primary for one sub-partition, as indicated by the heavy boxes. For example, BEP 460 is primary for sub-partition B1 466.

Figure 4C:
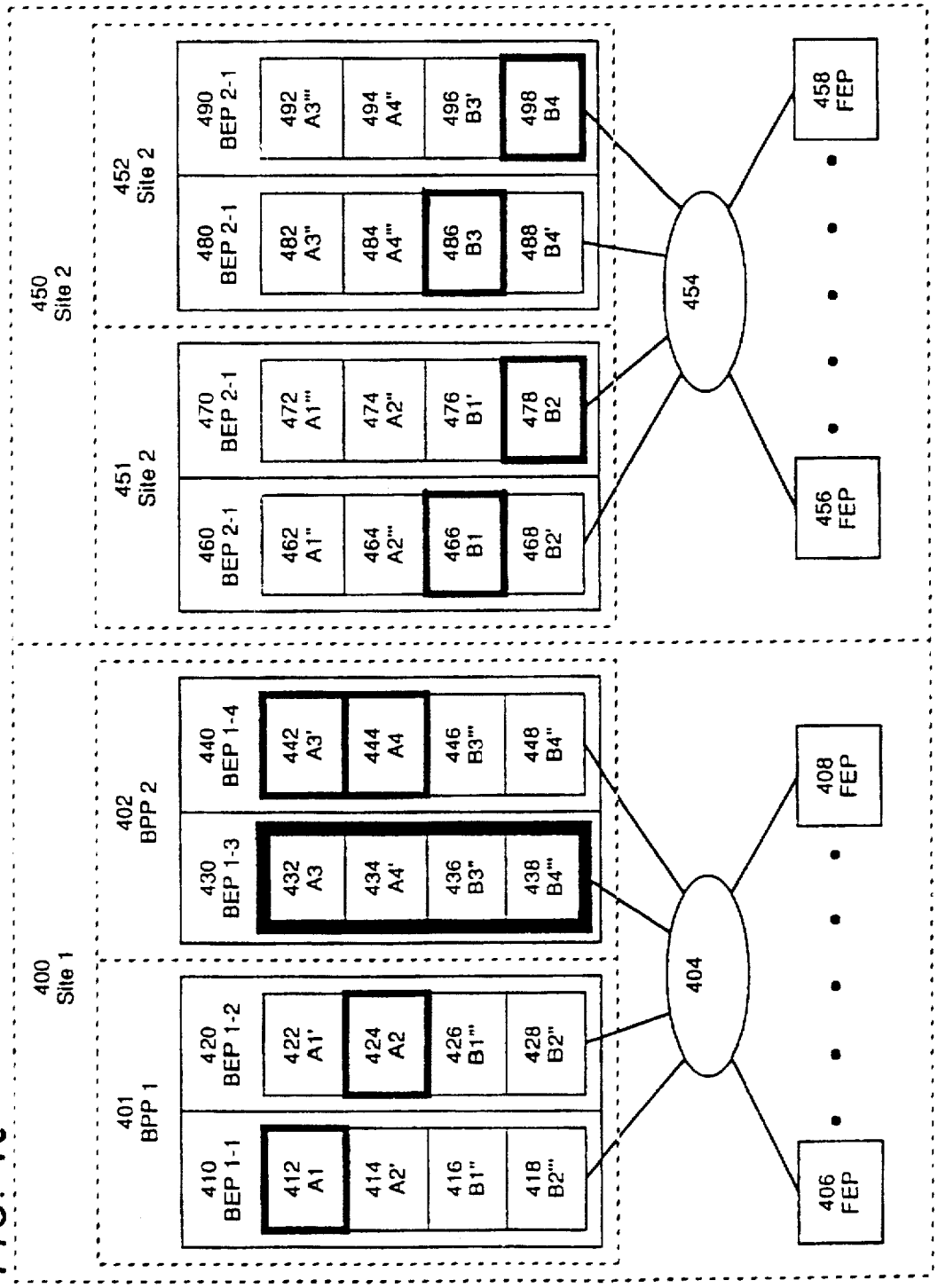
FIG. 4c is a block diagram of the embodiment of FIG. 4a, showing operation of the present invention during failure of one BEP.

FIG. 4c shows the operation of the embodiment of FIG. 4a for the case where one BEP has failed. Here, BEP 430 has failed, as indicated by the very heavy box. BEP 430 was primary for sub-partition A3 432, which is now unavailable. BEP 440 is secondary for sub-partition A3, so BEP 440 begins servicing sub-partition A3 using its copy of the sub-partition, A3' 442. BEP 440 will continue to service A3 until BEP 430 is restored.

Figure 4D:
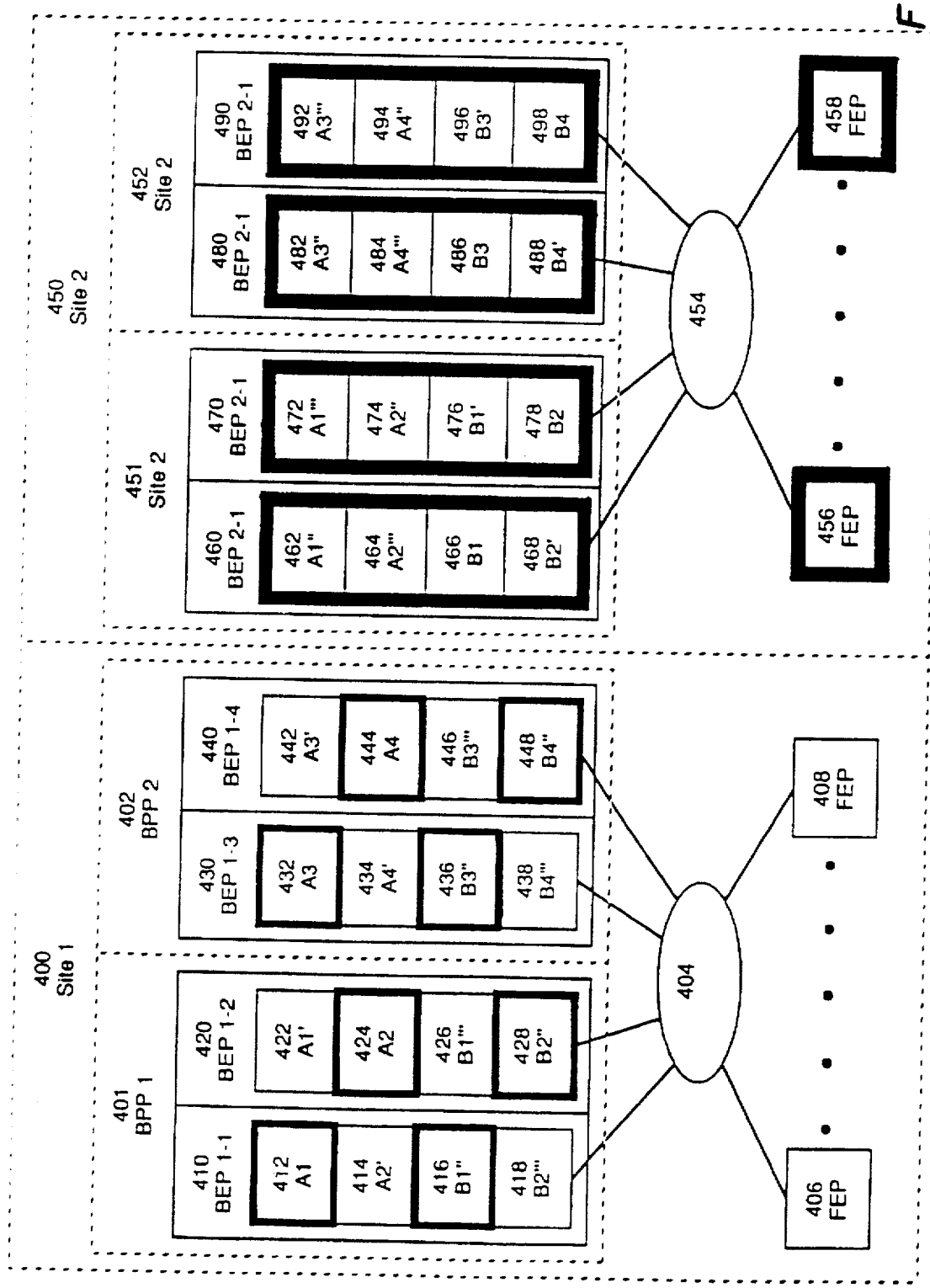
FIG. 4d is a block diagram of the embodiment of FIG. 4a, showing operation of the present invention during failure of an entire HLR site.

FIG. 4d shows the operation of the embodiment of FIG. 4a for the case where an entire HLR site has failed. Here, HLR Site 2 450 has completely failed. HLR site 450 was primary for sub-partitions B1-4, which are now unavailable. In addition, all secondary sub-partitions for B1-4 are also located in HLR site 450, and are likewise unavailable. The tertiary copies of sub-partitions B1-4 are located in HLR site 400, which is functioning. Therefore, the BEPs of HLR site 400 begin servicing sub-partitions B1-4 using their tertiary copies. This service will continue until either primary or secondary copies of each sub-partition again are available.

FIG. 5 shows a single HLR site 500, which may be one of a plurality of sites. In this embodiment, HLR site 500 has six BEPs paired in three BEP pairs. The database is partitioned into twelve sub-partitions A1-6 and B 1-6. However, each BEP only contains four of the twelve sub-partitions.

FIG. 6a is a flow diagram of a process 600, in accordance with the present invention. The process begins with step 602, in which an MSC/VLR in the wireless telecommunications network generates a database event and transmits a message communicating the event. A database event can be either a request for information from the HLR or an update to information in the HLR database. In step 604, the SS7 network routes the message to the HLR site having the highest priority copy of the sub-partition which is known to be available. In step 606, it is determined whether the destination HLR site received and acknowledged the message. If the destination HLR site did receive and acknowledge the message, the process goes to step 612, in which the destination HLR site processes the message. If the destination HLR site did not receive and acknowledge the message, the process goes to step 608, in which it is determined whether a lower priority sub-partition copy exists. If not, a failure message is returned to the message originator. If so, the message is routed to the next highest priority HLR site. The process then loops to step 606.

Figure 6B:
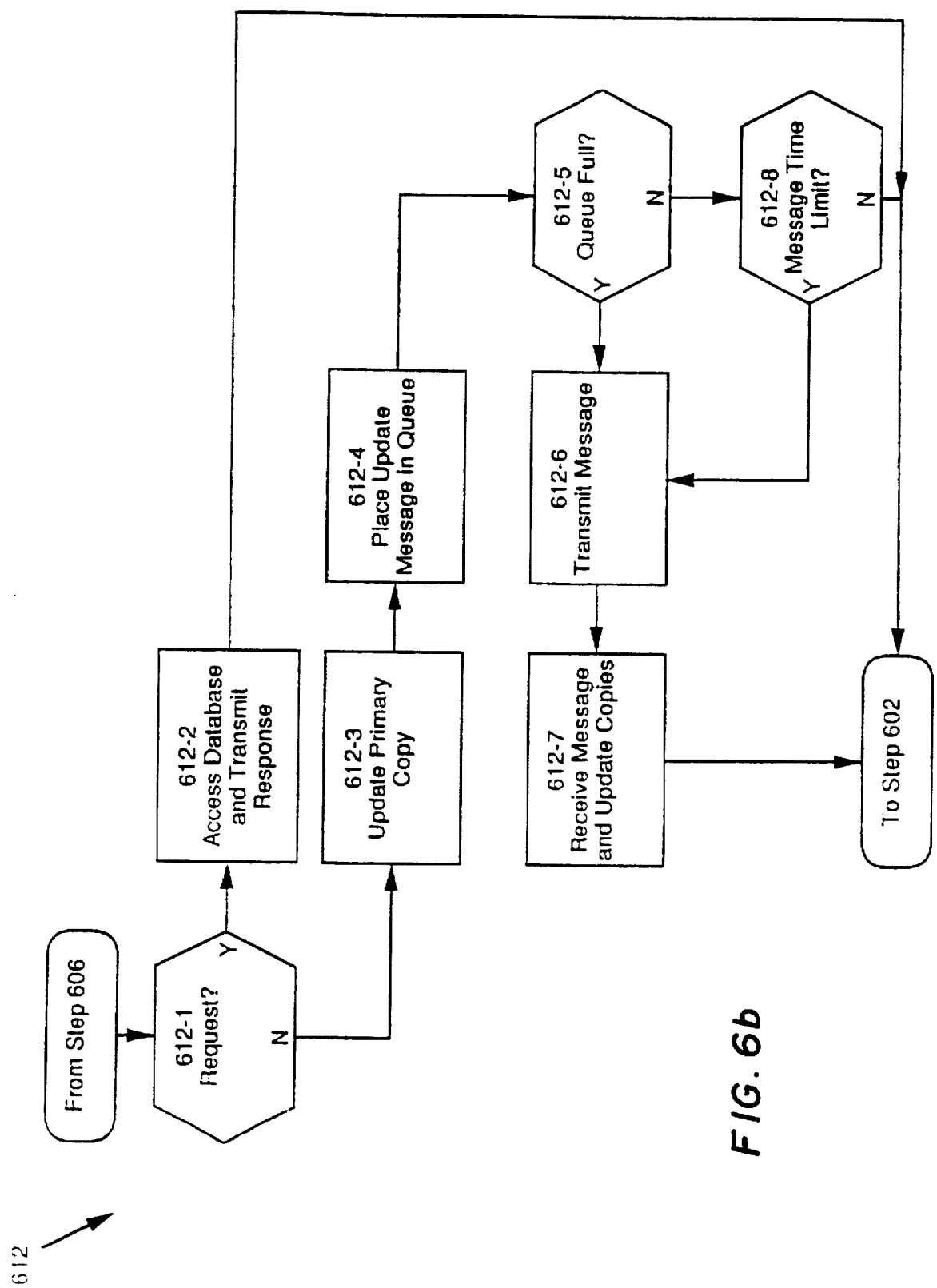

FIG. 6b is a flow diagram of a subprocess of step 612 of FIG. 6a, in which the destination HLR site processes the received message. The subprocess begins in step 612-2, in which the HLR site determines whether the message is a request for data from the database or an update to the database. If the message is a request, the process goes to step 612-2, in which the HLR site accesses the database and transmit a request message containing the requested information. The sub-process then goes to step 602. If the message is not a request, then it is a database update and the sub-process goes to step 612-3, in which the HLR site updates its copy of its primary partition. Then, in step 612-4, the HLR site places the update message in a queue for deferred transmission to the other HLR sites. In step 612-5, the HLR site determines whether the queue is full, that is, the queue contains a predefined maximum number of messages. If not, the process goes to step 612-8, in which the HLR site determines whether any messages have been in the message queue longer than a predefined maximum time. If not, the process goes to step 602.

If, in step 612-5, the HLR site determines the queue is full or, in step 612-8, the HLR site determines there are message over the time limit, the process goes to step 612-6 in which all update messages in the queue are transmitted. All messages destined for the same HLR site are grouped into one message and are transmitted as a group. This saves the considerable overhead involved in transmitting each message separately. In step 612-7, the destination HLR sites receive the update messages and update their copies of the database. The process then goes to step 602.

In order for database event messages to be routed in step 604 of FIG. 6a, the SS7 network must have some way to identify the destination HLR site for each message. There are a number of ways in which this could be done. For example, the message could be routed based on either the Mobile Subscriber Integrated Services Digital Network Number (MSISDN) or the International Mobile Subscriber Identity (IMSI).

In one embodiment two digits within an MSISDN match two digits within a corresponding IMSI. All other digits need not match. For all possible combinations of two digits—00 to 99—a mapping is maintained as to which partition the two number map onto. The mapping, known as a Global Title Translation (GTT), is performed in the SS7 network in order to route the message to the proper site. In the event a site has failed, backup sites are then routed to as shown in FIG. 6a.

In another embodiment, two digits are used in the IMSI for routing based on GTT as in the previous embodiment. However a second GTT table is set up for the MSISDN. This table uses the full meaningful prefix of the MSISDN to route on. For example, the first six or eight digits would be used, depending on the numbering plan being used. This prefix would then map to the appropriate partition, as for the IMSI.

What is claimed is:

1. A database system for a data communications network comprising a plurality of network elements, the system comprising:

a plurality of copies of a database of information relating to the network elements, each copy divided into a plurality of partitions, each partition containing information relating to a subset of the network elements;

a primary database system site for each partition, the primary site performing accesses and updates for its corresponding partition; and a secondary database system site for each partition, the secondary site performing accesses and updates for its corresponding partition, when the primary site for that partition is unavailable.

2. The system of claim 1, wherein each database system site is a primary site for at least one partition and a secondary site for at least one partition.

3. The system of claim 1, wherein each partition has one database system site and one secondary database system site.

4. The system of claim 1, wherein each database system site is a primary site for at least one partition and a secondary site for at least one partition and wherein each partition has one primary database system site and one secondary database system site.

5. The system of claim 1, wherein the primary database system site for a partition transmits an update of the partition to the secondary database system site for the partition.

6. The system of claim 5, wherein the primary database system for a partition defers transmitting the update of the partition until the period of time the update has been deferred exceeds a predefined maximum.

7. The system of claim 1, wherein the primary database system site for a partition transmits a plurality of updates of the partition to the secondary database system site for the partition.

8. The system of claim 7, wherein the primary database system site for a partition defers transmitting the updates until the number of updates deferred equals a predefined maximum.

9. The system of claim 7, wherein the primary database system site for a partition defers transmitting the updates until either the number of updates deferred equals a predefined maximum or the period of time the updates have been deferred exceeds a predefined maximum.

10. A database system for a telecommunications network comprising a plurality of subscriber terminals and a plurality of mobile service centers/visitor location registers, coupled to the subscriber terminals, the system comprising:
- a plurality of copies of a database of information relating to the subscriber terminals, each copy divided into a plurality of partitions, each partition containing information relating to a subset of the subscriber terminals;
- a primary home location register site for each partition, the primary site performing accesses and updates for its corresponding partition; and
- a secondary home location register site for each partition, the secondary site performing accesses and updates for its corresponding partition, when the primary site for that partition is unavailable.

11. The system of claim 10, wherein each home location register site is a primary site for at least one partition and a secondary site for at least one partition.

12. The system of claim 10, wherein each partition has one primary home location register site and one secondary home location register site.

13. The system of claim 10, wherein each home location register site is a primary site for at least one partition and a secondary site for at least one partition and wherein each partition has one primary home location register site and one secondary home location register site.

14. The system of claim 10, wherein the primary home location register site for a partition transmits an update of the partition to the secondary home location register site for the partition.

15. The system of claim 14, wherein the primary home location register site for a partition defers transmitting the update of the partition until the period of time the update has been deferred exceeds a predefined maximum.

16. The system of claim 10, wherein the primary home location register site for a partition transmits a plurality of updates of the partition to the secondary home location register site for the partition.

17. The system of claim 16, wherein the primary home location register site for a partition defers transmitting the updates until the number of updates deferred equals a predefined maximum.

18. The system of claim 16, wherein the primary home location register site for a partition defers transmitting the updates until either the number of updates deferred equals a predefined maximum or the period of time the updates have been deferred exceeds a predefined maximum.

19. A database system for a telecommunications network comprising a plurality of subscriber terminals and a plurality of mobile service centers/visitor location registers, coupled to the subscriber terminals, the system comprising:
- a plurality of home location register sites, coupled to the mobile service centers/visitor location registers, each home location register site comprising:
  - at least one copy of a database of information relating to the subscriber terminals, each copy divided into a plurality of partitions,
  - an event receiver, coupled to the mobile service centers/visitor location registers, receiving messages relating to subscriber terminal events, an update message transmitter, coupled to the other home location register sites, transmitting update messages including the received events to the other home location register sites,
  - an update message receiver, coupled to the other home location register sites, receiving update messages from the other home location register sites, and
  - a database updater, coupled to the event receiver and the update message receiver, updating the database to include the received event.

20. The system of claim 19, wherein the update message transmitter comprises: an update message queue, collecting received events;
- an update message scheduler, scheduling for transmission the collected received events in the update message queue when either the number of collected events exceeds a predetermined number or the amount of time each event has spent in the queue exceeds a predetermined limit;
- an update message generator, coupled to the update message queue, generating an update message including all received events in the update message queue which are currently scheduled for transmission; and
- an update message transmitter, transmitting the update message.

21. The system of claim 19, wherein each home location register site further comprises:
- a plurality of computer systems, each computer system containing a plurality of partitions of the database.

22. A method of operating a distributed database for a telecommunications network comprising a plurality of subscriber terminals, a plurality of mobile service center/visitor location registers and a plurality of home location register sites, the method comprising the steps of:
- providing a plurality of copies of a database of information relating to the subscriber terminals, each copy divided into a plurality of patrons, each partition containing information relating to a subset of the subscriber terminals;
- providing a primary home location register site for each partition;
- providing a secondary home location register site for each partition;
- performing accesses and updates, at a primary home location register site, of a corresponding partition of the site; and
- performing accesses and updates, at a secondary home location register site, of a corresponding partition of the site, when the primary site for the partition is unavailable.

23. The method of claim 22, wherein each home location register site is a primary site for at least one partition and a secondary site for at least one partition.

24. The method of claim 22, wherein each partition has one primary home location register site and one secondary home location register site.

25. The method of claim 22, wherein each home location register site is a primary site for at least one partition and a secondary site for at least one partition and wherein each partition has one primary home location register site and one secondary home location register site.

26. The method of claim 22, further comprising the step of:
- transmitting an update of a partition from the primary home location register site for the partition to the secondary home location register site for the partition.

27. The method of claim 26, further comprising the step of:
- deferring transmitting the update of the partition until the period of time the update has been deferred exceeds a predefined maximum.

28. The method of claim 22, further comprising the step of:
- transmitting a plurality of updates of a partition from the primary home location register site for the partition to the secondary home location register site for the partition.

29. The method of claim 28, further comprising the step of:

deferring transmitting the plurality of updates of the partition until the number of updates deferred equals a predefined maximum.

30. The method of claim 28, further comprising the step of:

deferring transmitting the plurality of updates of the partition until either the number of updates deferred equals a predefined maximum or the period of time the updates have been deferred exceeds a predefined maximum.

31. A method of maintaining a distributed database for a telecommunications network comprising a plurality of subscriber terminals, a plurality of mobile service center/visitor location registers and a plurality of home location register sites, the method comprising the steps of:

providing in each home location register site a database containing information relating to the subscriber terminals, the database divided into a plurality of partitions, each partition containing information relating to a subset of the subscriber terminals, each home location register site having a partition uniquely designated as a primary partition of that home location register site and each partition designated as the primary partition of a home location register site;

receiving, in the telecommunications network, a subscriber terminal event; routing the event to a first home location register site in which the primary partition contains information relating to the subscriber terminal which generated the event;

updating the database of the first home location register site with the received event; and thereafter updating the databases of the home location register sites to which the event was not routed, with the received event.

32. The method of claim 31, wherein the step of updating the databases of the home location register sites to which the event was not routed comprises the steps of:

transmitting an update message from the first home location register site to a second home location register site; and responsive to receiving the update message from the first home location register site, updating the database in the second home location register site.

33. The method of claim 32, wherein the step of updating the databases of the home location register sites to which the event was not routed comprises the steps of:

transmitting an update message from the first home location register site to each other home location register site, in order of priority of the other home location register sites; and responsive to receiving the update message from the first home location register site, updating the database in the receiving home location register site.

34. The method of claim 33, wherein the step of updating the databases of the home location register sites to which the event was not routed comprises the steps of:

collecting update messages in a queue;

transmitting the messages in the queue when the queue becomes full or a message has been in the queue longer than a predetermined length of time; and responsive to receiving the update message from the first home location register site, updating the database in the receiving home location register site.

* * * * *